United States Patent
Bahgat et al.

(10) Patent No.: US 9,868,393 B2
(45) Date of Patent: Jan. 16, 2018

(54) VEHICLE ACCIDENT AVOIDANCE SYSTEM

(71) Applicant: INTERNATIONAL BUSINESS MACHINES CORPORATION, Armonk, NY (US)

(72) Inventors: Mohamed A. Bahgat, Dublin (IE); Ossama Emam, Cairo (EG); Ayman S. Hanafy, Cairo (EG); Sara A. Noeman, Cairo (EG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/965,072

(22) Filed: Dec. 10, 2015

(65) Prior Publication Data

US 2017/0166123 A1  Jun. 15, 2017

(51) Int. Cl.
 *B60Q 1/00* (2006.01)
 *B60Q 9/00* (2006.01)
 *B60W 30/095* (2012.01)

(52) U.S. Cl.
 CPC ......... *B60Q 9/008* (2013.01); *B60W 30/0956* (2013.01); *B60W 2550/20* (2013.01); *B60W 2550/302* (2013.01); *B60W 2900/00* (2013.01)

(58) Field of Classification Search
 CPC .............. B60Q 9/008; B60W 30/0956; B60W 2550/20; B60W 2550/302; B60W 2900/00
 USPC ........................................................ 340/436
 See application file for complete search history.

(56) References Cited

U.S. PATENT DOCUMENTS

| | | | |
|---|---|---|---|
| 7,295,925 B2 | 11/2007 | Breed et al. | |
| 8,204,732 B1* | 6/2012 | Simsek ..................... | G06F 8/34 703/16 |
| 2004/0034467 A1* | 2/2004 | Sampedro .......... | G01C 21/3492 701/533 |
| 2008/0027647 A1* | 1/2008 | Ansell ................... | G01S 13/723 701/301 |
| 2008/0084283 A1* | 4/2008 | Kalik ....................... | B60Q 9/00 340/435 |
| 2008/0167820 A1 | 7/2008 | Oguchi et al. | |

(Continued)

OTHER PUBLICATIONS

Wahlberg et al., "Driver Celebration Behavior and the Prediction of Traffic Accidents", International Journal of Occupational Safety and Ergonomics (JOSE) 2006, vol. 12, No. 3, pp. 281-296.

(Continued)

*Primary Examiner* — Naomi Small
(74) *Attorney, Agent, or Firm* — David Zwick, Esq.; Kevin P. Radigan, Esq.; Heslin, Rothenberg, Farley & Mesiti, P.C.

(57) ABSTRACT

Method and system are provided for vehicle accident avoidance carried out with respect to a host vehicle by modeling behavior. The method includes: monitoring a surrounding environment of the host vehicle and detecting other vehicles in a vicinity of the host vehicle by at least one visual sensor. The method further includes: estimating a speed and direction of each of the detected vehicles; calculating one or more projected paths of each of the detected vehicles based on their current estimated speed and direction, the current monitored surrounding environment, and other vehicle projected paths; estimating a probability of intersection of each projected path with the host vehicle; and providing an alert or action to the host vehicle if there is a high probability of intersection.

20 Claims, 13 Drawing Sheets

(56) References Cited

U.S. PATENT DOCUMENTS

| | | |
|---|---|---|
| 2010/0201509 A1 | 8/2010 | Lara et al. |
| 2011/0043377 A1 | 2/2011 | McGrath et al. |
| 2011/0184588 A1* | 7/2011 | Brusilovsky ....... G01C 21/3407 |
| | | 701/1 |
| 2012/0033123 A1* | 2/2012 | Inoue ....................... G08G 1/04 |
| | | 348/333.13 |
| 2013/0060401 A1 | 3/2013 | Hahne et al. |
| 2015/0183431 A1 | 7/2015 | Nanami et al. |
| 2016/0219645 A1* | 7/2016 | Turakhia ............. H04W 76/028 |

OTHER PUBLICATIONS

Anonymous, "Collision Prediction Between Vehicles in an Unstructured Environment", Sciences and Techniques of Automatic Control and Computer Engineering (STA), 2013 14th International Conference on Dec. 20-22, 2013.

\* cited by examiner

VEHICLE ACCIDENT AVOIDANCE SYSTEM

BACKGROUND

The present invention relates to a vehicle accident avoidance system, and more specifically, a vehicle accident avoidance system based on modeling of drivers' behavior and surrounding conditions.

Transportation accidents pose significant losses to both human lives and assets. Significant percentage of such accidents can be avoided if the right decisions are taken early and quickly. The challenge arises from the huge set of parameters that are to be taken into consideration when making a decision to an avoid incident. One main parameter is the surrounding environment. The environment can be in a state with high probability of accidents such as the presence of rain, as a weather variable, which makes road conditions slippery and results in significantly lower vision clarity. Also, the presence of holes or cracks, as a road variable, may prompt drivers to take quick and unforeseen actions to avoid these objects.

Another main parameter is human actions. A dimmer may decide to perform one or more actions, such as quickly changing lanes, causing a ripple effect involving other vehicles. While the initial action may not directly contribute to an accident, other drivers' reactions may, especially where some may be based on instinct rather than a planned, well-thought-of decision.

SUMMARY

According to one or more aspects of the present invention, a computer-implemented method is provided for vehicle accident avoidance carried out with respect to a host vehicle. The method comprises: monitoring a surrounding environment of the host vehicle; detecting other vehicles in a vicinity of the host vehicle by at least one visual sensor; estimating a speed and direction of each of the detected vehicles; calculating one or more projected paths of each of the detected vehicles based on their current estimated speed and direction, the current monitored surrounding environment, and other vehicle projected paths; estimating a probability of intersection of each projected path with the host vehicle; and providing an alert or action to the host vehicle if there is a high probability of intersection.

According to one or more other aspects of the present invention, a system for vehicle accident avoidance is provided. The system includes a memory, and a processor communicatively coupled to the memory, wherein the system performs a method, which includes: monitoring a surrounding environment of the host vehicle; detecting other vehicles in the vicinity of the host vehicle by at least one visual sensor; estimating a speed and direction of each of the detected vehicles; calculating one or more projected paths of each of the detected vehicles based on their current estimated speed and direction, the current monitored surrounding environment, and other vehicle projected paths; estimating a probability of intersection of each projected path with the host vehicle; and providing an alert or action to the host vehicle if there is a high probability of intersection.

According to one or more further aspects of the present invention, a computer program product is provided for vehicle accident avoidance. The computer program product comprises a computer readable storage medium having program instructions embodied therewith, the program instructions executable by a processor to cause the processor to: monitor a surrounding environment of the host vehicle; detect other vehicles in a vicinity of the host vehicle by at least one visual sensor; estimate a speed and direction of each of the detected vehicles; calculate one or more projected paths of each of the detected vehicles based on their current estimated speed and direction, the current monitored surrounding environment, and other vehicle projected paths; estimate a probability of intersection of each projected path with the host vehicle; and provide an alert or action to the host vehicle if there is a high probability of intersection.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood with reference to the following detailed description when read with the accompanying drawings.

Embodiments of the present invention are described below, by way of example only, with reference to the drawings, in which.

Figure 1:
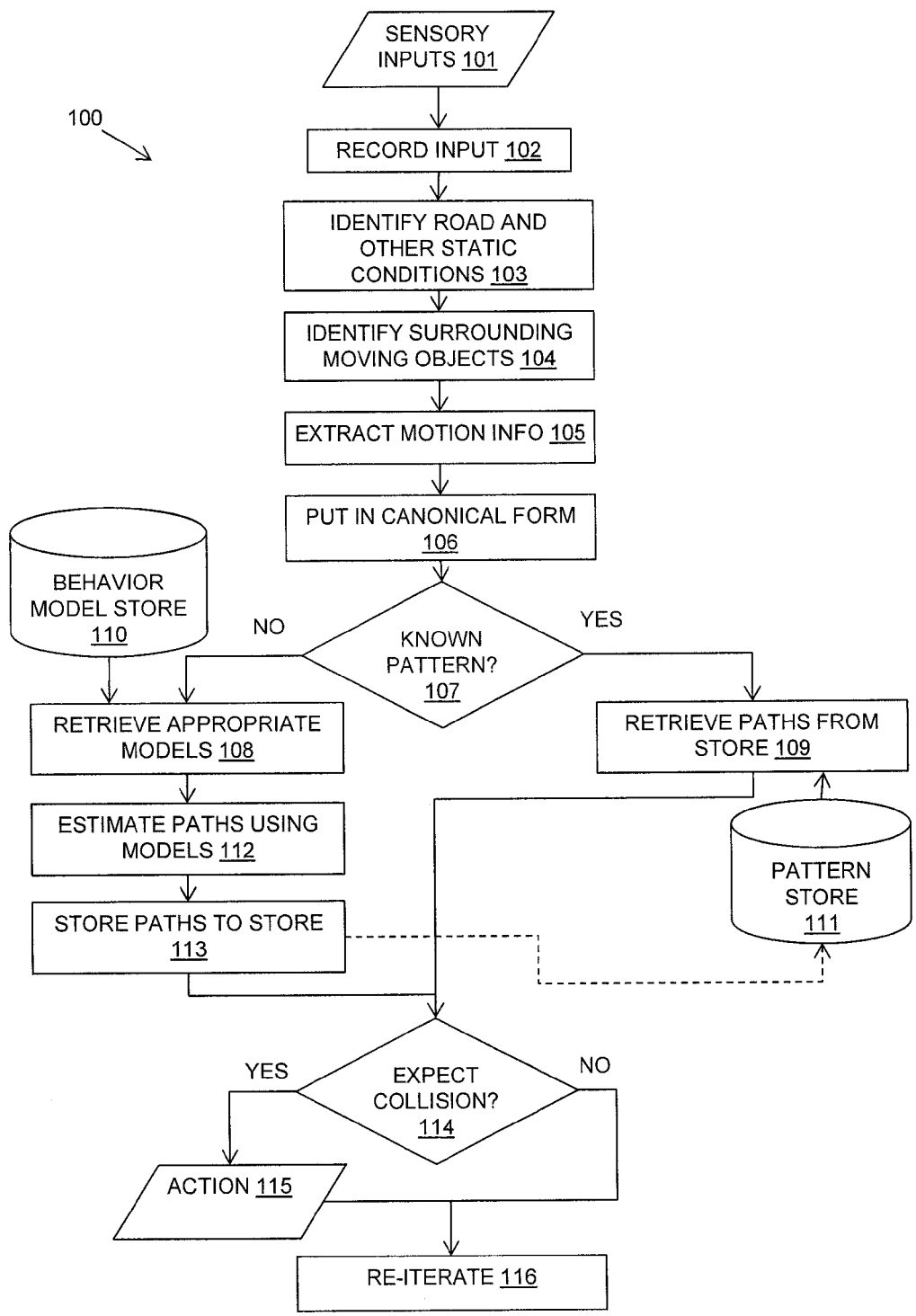
FIG. 1 is a flow diagram of an example embodiment of a method, in accordance with one or more aspects of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are provided that predict incident occurrences based on modeling of vehicle driver behavior and surroundings. Such modeling takes into consideration environment parameters as well as human expected actions and reactions. If a hazardous condition is predicted, an alert is shown to the driver and suggested actions are provided or automatically carried out.

The described system predicts, for instance, possible cases where incidents may occur. Modeling may be carried out of drivers' attitude with respect to each other and conditions on the road and then project their motion paths and estimate incident occurrence. Modeling may be based on machine learning techniques. A classifier may be used to classify the condition and if considered hazardous, either a warning signal is shown to the driver or an action autonomously is taken. The former case can typically be implemented with a discriminative classifier such as provided by support vector machines. The latter case is more complex and may involve a wide range of outputs where typically a generative model may do better.

The system perceives the surrounding environment with mainly a visual sensor. The visual sensor allows for rich information to be extracted from the input from a single source. Additional sensory inputs may be used such as radar signals, noise perception and similar cases.

During system operation onboard a host vehicle, the system continuously extracts information from the surrounding environment. It projects possible paths for each detected surrounding vehicle based on their current state and their modeled behavior in addition to the current environment conditions which include road conditions, road smoothness or hazards, weather conditions, and pedestrian presence. If one of the estimated paths has high probability and intersects with the host vehicle path then an alert or action may be taken to avoid collision. Thus, the decision of alerting or action may be the product of measuring the probability of each case and its severity.

Predicting incidents gives the advantage of allowing more time to take action rather than reacting at the time of incident occurrence. Early alert enables a driver to be able to take decisions early and increases the probability of avoiding an incident. While for automated action, it allows more accurate decisions and smoother actions to be taken. Also, modeling human behavior enables deduction of more complex actions rather than using the current state only of vehicles.

Prediction may be based on modeling human behavior in different situations. Such modeling may be based on machine learning. Samples of human behavior are collected via monitoring actual actions during driving. The resulting models are then clustered based on different parameters such as vehicle class; for example, a truck reaction to an incident is different from a passenger vehicle reaction. Models may also be tailored to specific persons to involve more specific driving patterns. In this case, the system can also model their usual destinations and thus project more into the future.

The following are example scenarios to highlight the use of prediction in different incidents.

Scenario: An Object on the Road Causing a Ripple Effect
1. The proposed system is installed in a host vehicle and the system identifies all other surrounding vehicles within a surrounding area to the host vehicle.
2. The system estimates the speed for each identified vehicle.
3. The system identifies an object on the road ahead of one of the identified vehicles.
4. Using preloaded models, the system estimates the action of an affected vehicle and projects possible new paths.
5. Iteratively, the system estimates the reaction of other vehicles surrounding the host vehicle with new estimated projected paths for each vehicle.
6. The system evaluates the probability of each chain of new projected paths and their severity.
7. The system prunes low probability cases.
8. High probability cases are considered and new projected paths are checked whether they are intersecting with the host vehicle path or not.
9. If there is an intersection a warning is displayed or an automated action is taken to avoid collision by the host vehicle.

Scenario: A Driver Exits Quickly from a Road
1. A vehicle has the proposed system installed as previously stated and the system identifies in the left lane a vehicle is signaling to the right.
2. The system accesses a map, and identifies an exit from the road. The exit is assumed to be the driver of the signaling vehicle's destination.
3. Also, using the map, the distance between the vehicle in question and the exit is identified.
4. The motion paths of the vehicle in question and other ones are estimated with their corresponding probabilities to detect possible collision course and reacts accordingly.

Scenario: A Known Driver Exists from the a Road
1. Similar to the previous scenarios, a vehicle with the proposed system installed identifies other vehicles in its surroundings. The system also determines the identification of the other identified vehicles, by using means such as license plate identification for example, and determines which of the identified vehicles has a stored model.
2. Using this identified model the driver is known to exit the road in a near location and the driver is known to take late decisions.
3. Accordingly, a late decision is assumed and motion paths for all surrounding vehicles are estimated to detect collision courses Scenario: A Hazardous Case of Moving in a Wrong Direction
1. Surrounding vehicles are identified in a three lane road.
2. A vehicle is identified to be moving in the wrong direction and is moving on the right most lane at a considerable speed.
3. Another vehicle is travelling at speed and is coming from behind with an identified model that the driver occasionally uses the right lane while speeding.
4. Paths are projected and the cases of collision and sudden change of lanes are generated from the model and the ripple effect is estimated.

Possible collision courses are estimated and a warning may be signaled or appropriate action is taken.

Referring to FIG. 1, a flow diagram 100 shows an example embodiment of the described method carried out by an accident avoidance system provided on a host vehicle. Some or all of the described functionality may be carried out remotely to the vehicle if there is an established communication with a remote processing server.

The system captures data about the surrounding environment through different sensory inputs 101. The main input is in the form of images from a camera onboard the host vehicle to perceive visually the surrounding environment. There may be other types of sensory inputs that might not be covered by images or covered but with less accuracy such as light, rain, audio, or radar sensors, in addition to maps.

The data inputs from the different sensory inputs may be recorded 102 for further processing and the storage of such data may be optimized for the overall processing considerations. The data stored may be processed into information used by the further steps within the proposed system.

Road and other static conditions as well as weather conditions may be identified 103. This may focuses on environment parameters such as: (a) weather conditions in terms of rain and its quantity (b) weather conditions in terms of existence of ice and its type (c) road conditions in terms of existence of bumps or holes (d) road conditions in terms of existence of slippery liquids (e) road conditions in terms of object on the road such as obstacles (f) route conditions such as the existence of an exit, U-turn, traffic signals and others (g) visibility range.

Surrounding objects, such as vehicles, may also be identified 104. The identified information may be classified according to the class of vehicle, for example: sedan, utility vehicle, truck and others. Also, more information is identified, if available, such as license plates to extract a vehicle's unique identification, car conditions if one of its mirrors is broken, or any other problems.

Motion information may be extracted 105 and estimated for the current vehicle and all other surrounding vehicles or items. This uses the in-vehicle sensors or GPS location updates to estimate the current vehicle's speed. Using this speed and the relative speed estimates for other moving objects their speeds may also be estimated.

All of the information may be gathered 106 into an appropriate form canonical form (for example a "feature vector") so that it can be used in further computations in an efficient manner.

As an optimization, it may be determined 107 if the pattern of information is a known pattern or not. If it is, then the estimates of motion paths may be retrieved 109 from a pattern store 111. If it is a new pattern, then appropriate moving object behavior models (MOBMs) for surrounding detected objects may be retrieved from a database 108 or behavior model store 110, to estimate each motion. For example, if there was a truck within the surrounding range, then the model used to estimate the behavior of trucks is retrieved and the same applies for passenger cars. After model retrieval, motion paths are estimated for all surrounding objects 112. Each vehicle may have several paths estimated with a computed degree of confidence. These estimations may then be stored 113 within the pattern store or cache 111 for quicker future computations.

There are different locations where information about models and patterns may be stored. For instance, information may be on a main centralized server or cloud, which is of significant size and could store all relevant information, and another would be in a cache in an on-board vehicle system, which would be relatively small. The role of the server might be store all information about all models and patterns. While the role of the on-board memory would be to cache what was retrieved from the central server or calculated locally to avoid retrieving again or calculating again. It should be noted that as the on-board cache is limited in size, once it is full, the least used or oldest pattern or model may be removed from the memory to make space for newly retrieved models or generated patterns.

A stored pattern may store information about parameters and conditions including the following: surrounding path parameters, which may include: curvature, ascent, descent and conditions of the path being traveled by the current vehicle for a given segment of time; surrounding vehicle parameters such as locations, speeds and types for the same segment of time; and other parameters that may affect driving decisions which include but are not limited to the previously mentioned.

This pattern may be stored in the form of a feature vector. If at any current time the path and surrounding vehicle parameters match one of the stored pattern feature vectors exactly or with small difference, the corresponding recommended state or actions may be retrieved and executed directly from a table. In one implementation, a hash table may be provided with the pattern feature vector as the key and state/action as the value. A typical example scenario would be a vehicle moving through a motorway with sparse presence of surrounding vehicles during a dry weather. This pattern may be common enough to be used throughout the parts of the journey where it is similar.

After the motion paths are estimated for all cases intersections may be estimated 114, which corresponds to a collision. If a collision is expected or, in more general terms, a hazardous condition, then a warning or action or a group of actions may be generated 115. Once this cycle finishes, the process may be repeated 116 during the system's operation on the vehicle.

Figure 2:
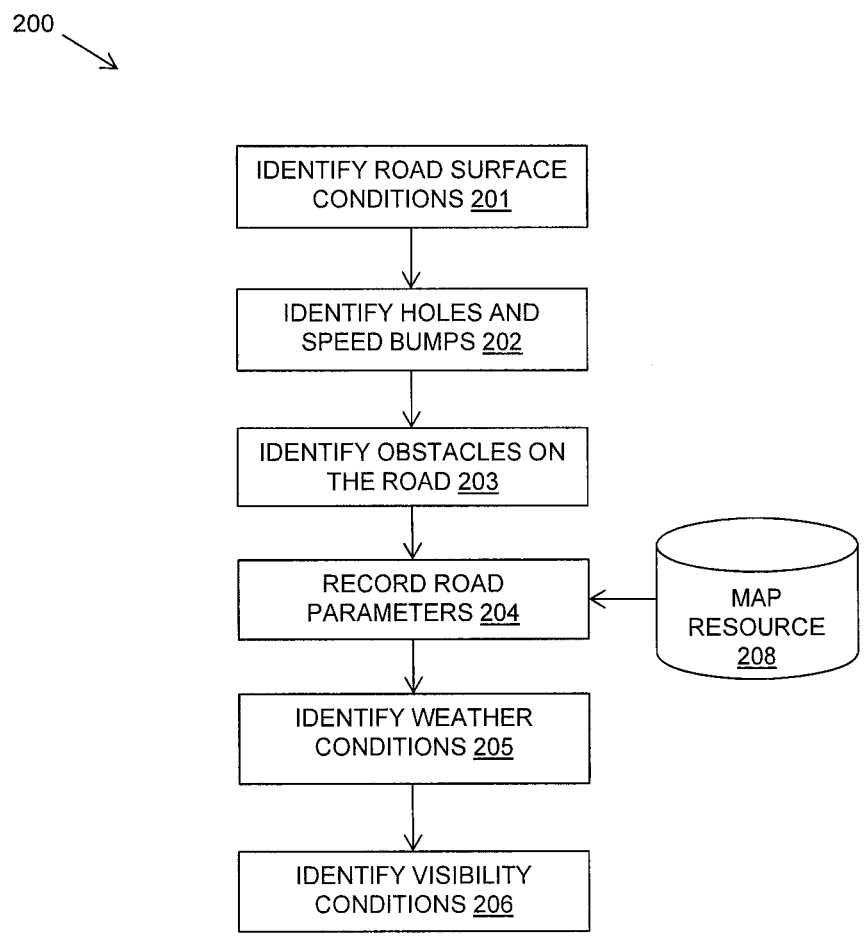
FIG. 2 is a flow diagram of an example embodiment of an aspect of the method of FIG. 1, in accordance with one or more aspects of the present invention.

Referring to FIG. 2, a flow diagram 200 shows in more detail one embodiment of the information acquisition process related to the vehicle surrounding environment of step 103 of FIG. 1.

Surface condition information where the vehicle is moving may be identified 201 and extracted. Condition examples may be the type of road the vehicle is using, such as paved, tarmac or concrete, or unpaved. Also, conditions may include whether the surface has any type of liquids that are present and their relative location for the vehicle.

Surface irregularities may be identified 202 such as holes and road bumps with their parameters such as length, width, height, and smoothness, in addition also to their relative location to the vehicle.

Obstacles that may be presented on the road are also identified 203 and their relative location, shape and size estimated. Any non-moving object on the road is considered an obstacle.

Road parameters may be retrieved and recorded 204 from map resources 208, if available, to get more information related to the route conditions such as the presence of entrances, exists, speed limit, stop signs, U-turns and other similar pieces of information. Such information can also be acquired through onboard imaging systems or other kinds of sensors such as radars.

Weather conditions may also be captured 205 through onboard sensors. Conditions may be related to, for example, rain, snow, ice or heat. Rain and ice may affect the slipperiness of the road surface which in turn affects the breaking distance. Heat can also have negative effect on tires, which may lead to bursting. Weather conditions may also be obtained from weather forecasting or information services.

Visibility conditions may also be recorded 206. This may be acquired through camera information. It can also rely on weather reports in the area where the vehicle is passing through. Parameters affecting visibility may be, as examples, fog, rain, snow, lighting conditions and their changes.

Data extracted from each step of FIG. 2 may then be put into a numerical form and may be quantized for optimization.

Figure 3:
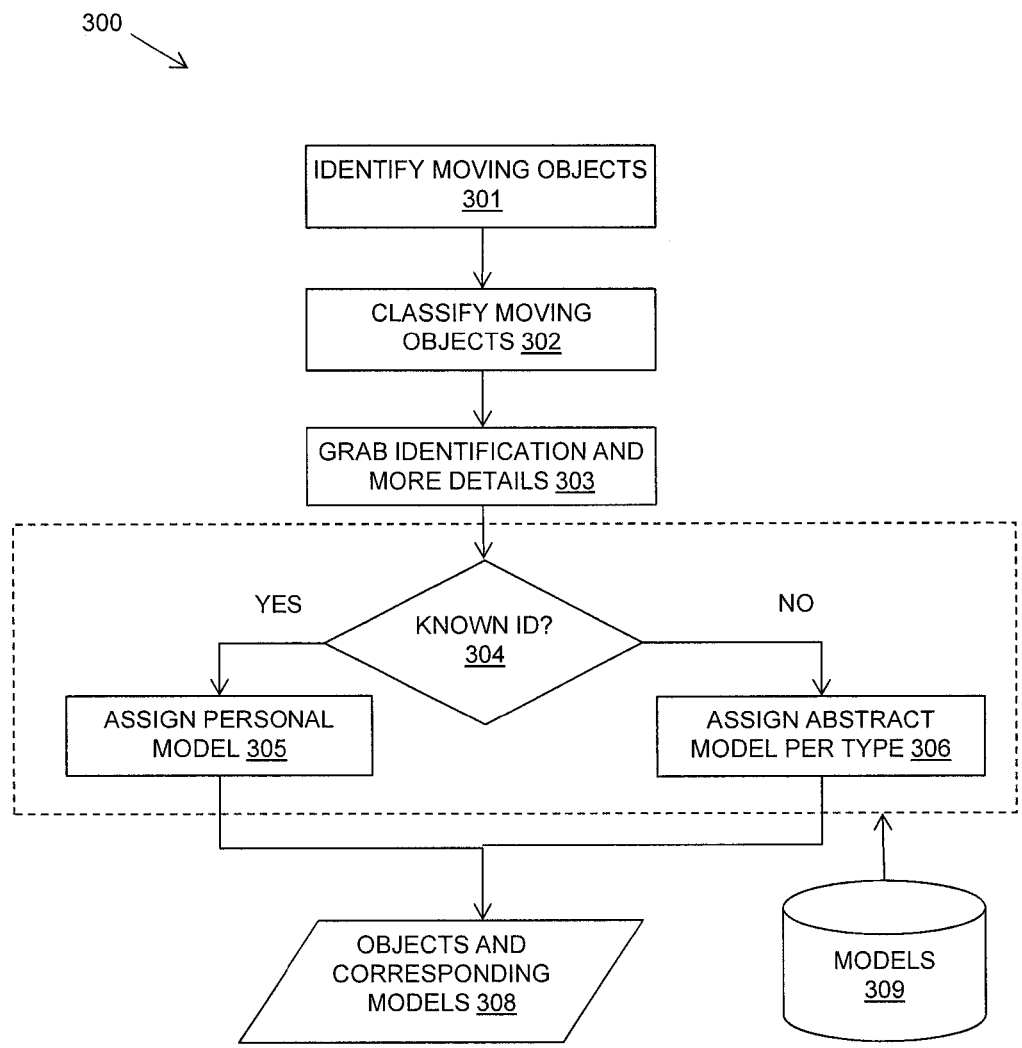
FIG. 3 is a flow diagram of an example embodiment of an aspect of the method of FIG. 1, in accordance with one or more aspects of the present invention.

While FIG. 2 discusses information about stationary objects and surroundings, FIG. 3 shows more details about information acquired for surrounding moving objects.

Referring to FIG. 3, a flow diagram 300 shows in more detail one embodiment of the information acquisition process related to surrounding moving objects of step 104 of FIG. 1.

Moving objects may be identified 301. Mainly, they are of two types, which are vehicles (with all their subtypes) and humans (or pedestrians). However, moving objects may also include animals, jumping balls, or any other object that moves.

The identified objects may be classified 302 into their classes and subclasses. For example, a vehicle is first identified, and then it is labeled by a subclass corresponding to its type: passenger car, utility vehicle, truck and others. Further analysis may be carried out on the identified objects.

The system may attempt to obtain 303 unique identification for the object, if available, such as the license plate of a vehicle. Also, fine object details may be grabbed, such as a broken mirror, malfunctioning taillight and others. This information may be grabbed through different images captured within different times. It may be determined 304 if the system was able to obtain a unique identification. If so, then a corresponding unique model may be assigned 305. If not, the most specific model of an abstract model per type that is related to the moving object parameters is assigned and retrieved 306. These models may be retrieved from a database of models 309. For each identified moving object there may be a corresponding behavior model outputted in step 308.

An example here describes the role of models. If a person, identified by his vehicle's license plate, is known to leave from his home and take a specific exit at a given time, if that person appears in the line of vision then his projected path should be affected by his tendency to go towards this exit. Based on the other vehicles' paths plus his known behavior (tends to be more safe so approaches the exit early versus tends to be more aggressive and makes late decisions), his path can be estimated or several suggested paths estimated.

Figure 4:
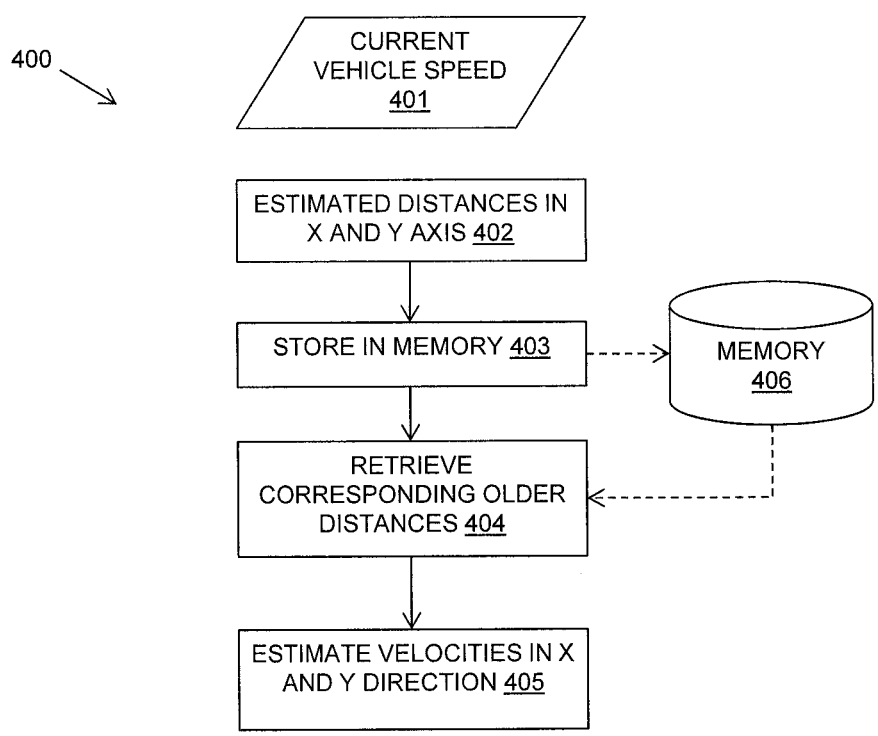
FIG. 4 is a flow diagram of an example embodiment of an aspect of the method of FIG. 1, in accordance with one or more aspects of the present invention.

Referring to FIG. 4, a flow diagram 400 shows in more detail one embodiment of the motion estimation of step 105 of FIG. 1.

FIG. 4 shows an example procedure for motion estimation for surrounding objects. The current host vehicle speed may be acquired 401 either by the vehicle sensor or any other means such as GPS. At each time instance, the distances between the current vehicle and other objects may be calculated 402. This may be calculated by using stereovision, radar sensors supported with data from images, or any other tool for calculation. The calculations for each object may be stored 403 within a dedicated memory 406 along with a time stamp for this data. Older distances for the same objects may be retrieved 404 if they exist. Finally motion in horizontal and vertical directions relative to the moving host vehicle is estimated 405. This step may allow for classifying identified objects as stationary or moving objects.

Figure 5:
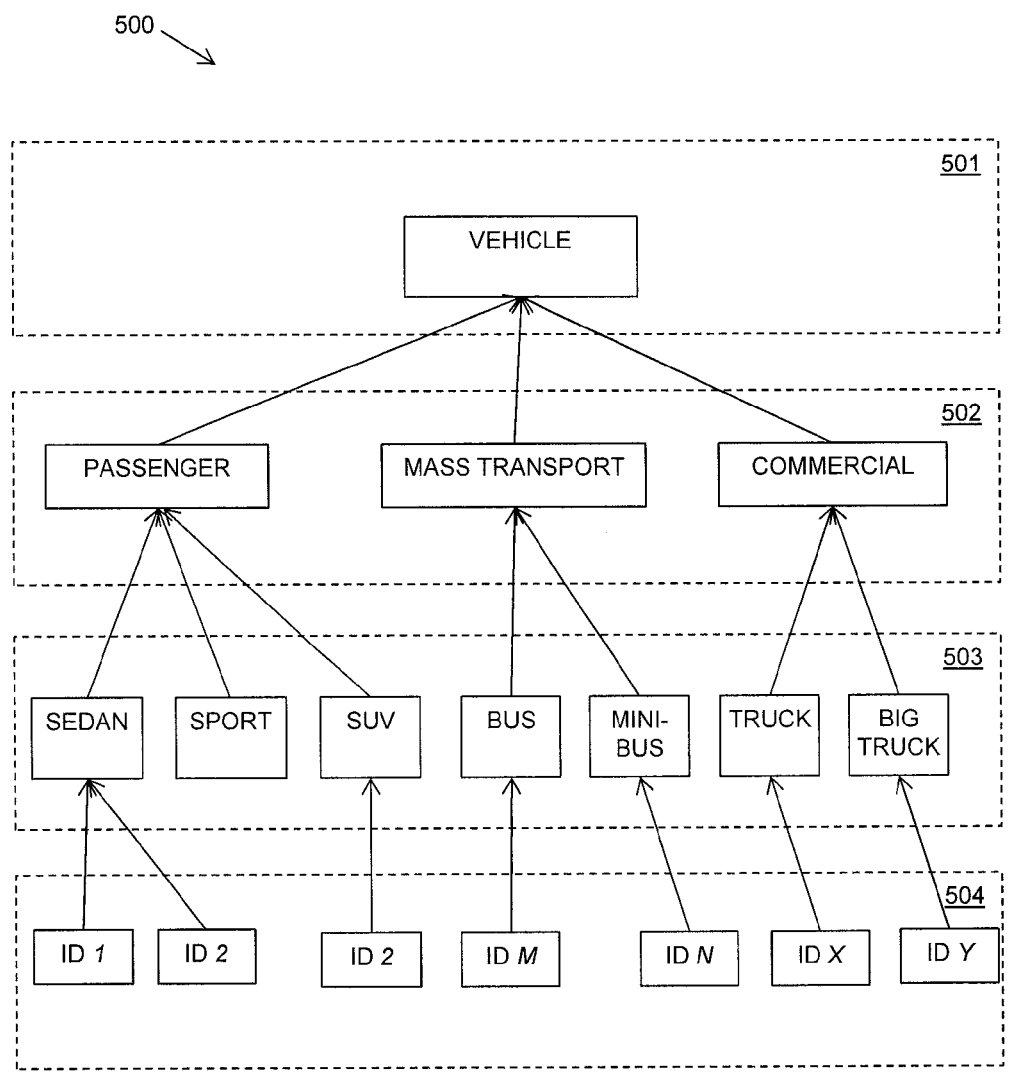
FIG. 5 is a schematic diagram of an example hierarchy of vehicles, in accordance with one or more aspects of the present invention.

FIG. 5 shows a schematic diagram 500 of how a Moving Object Behavioral Model (MOBM) may be implemented. The top levels are the most generic moving downwards to more specific models. In a first level 501, a generic "vehicle" model describing all types of vehicles actions may be stored. This model may be produced by integrating all data related to all types of vehicles. Moving one level down 502, more specific levels are stored, but still fairly generic. Three models are shown, by way of example, one for passenger vehicles, another for mass transport, and one for commercial vehicles. In the third level 503, subtypes may be used for more specific modeling. This level may be expected to be most used. It is easy to identify these categories; however, if object classification fails to differentiate whether a vehicle is one of those types it may use the more generic case.

These models may be created by training them on captured data from actions and reactions from actual events. In addition, physics models may be used to tune trained models or used solely to model other objects such as a moving ball. Tracking to generate training data can be easily done using GPS logging in addition to image information provided by willing or dedicated users for the system. Also, tracking vehicles may be done, in the same way the system tracks other objects, by recording their actions relative to their motion. This information may be stored within the vehicle and sent to a server, which updates the existing models based on the new outcomes. In this way, the system models are improved by seeing significantly more training data shared from different users.

The last level 504 may be used for uniquely identified cases. These models may either be built through the collected GPS data for people who provide such information or by tuning the more generic models based on incidents reported for specific persons, for example, a person who drove a sedan has a significant number of speeding tickets, or has committed more than one recorded traffic incident at curves.

It is worth noting that there may be several dimensions for the models. For example, there may be a derivative of passenger vehicles (sedans for instance) that have the right mirror broken. Such vehicles are expected to behave significantly differently. Another example, people living and working in suburbs or foreigners can act differently in other driving environments.

The proposed disclosure models other drivers behavior to predict their actions and if that would cause a hazard. Such modeling is based on machine learning where previous behavior allows to predict the outcomes for coming events. Training data could be collected first to train the learning models. This data can be collected by crowd-sourcing from regular drivers that would volunteer, from system users, from fleets or paid drivers.

One implementation is to regard this as a regression problem where we try to predict two parameters (dependent variables): steering angle and acceleration/declaration rates for each moving vehicle in the surrounding environment. In one or more embodiments, polynomial regression may be used. In training mode, each vehicle encodes the information perceived about moving and stationary objects into numerical values relative to the current vehicle in addition to the driver's decisions with regard to steering and acceleration as ground truth. In running/execution mode, for each vehicle in the surrounding environment, the perceived information is mapped to this vehicle and the model is executed to predict the steering and acceleration rates.

For a given training sample, the input for training sample i for feature j may be represented by $x\_ij$ and $x^2\_ij$. These inputs are weighted with $b\_j1$ (for first order) and $b\_j2$ (for second order) and mapped to an expected outcome $y\_i$. An expected error for a training sample would be $e\_i$. The general form would be:

$$Y = B*X + E$$

For example, the distance between the current vehicle and a front object can be considered as the input independent variable. The expected steering angle would be calculated by:

$$y = b\_0 + (b\_1*x) + (b\_2*x^2) + e$$

The regression coefficients b_0, b_1, and b_2 are calculated by using maximum likelihood estimation using perceived information x and user actions y. The information captured include: current speed, current acceleration, distance to nearest object in at the front, distance to the nearest object to the back, distance to nearest object at the left of the vehicle and its current angle, and likewise to the right, and other information.

To build a model for each individual models, the training samples out of their driving are only included.

The more abstract model, for example: passenger vehicles, the training samples from all other drivers for the same category are used to estimate the coefficients.

A different approach would be to consider this as a purely classification problem. For instance, logistic regression could be used to classify in an abstract way if the whole situation is danger or not, but such an approach would limit our capabilities in terms of taking actions if required based on more granular calculations.

Another implementation would use neural networks. The neural network might comprise three layers, the first layer having a number of perceptrons equivalent to perceived information which is used as input features. In addition, there may be a hidden layer and an output layer containing two perceptrons for steering and acceleration rates values prediction. Similarly the neural network may be trained with data sampled from drivers' actions.

A further proposed implementation would be based on support vector machines (SVM), where the values of steering and acceleration are discretized and each is considered as a single class. The decision space is split accordingly. The SVM is trained with drivers' information to adjust boundaries parameters.

In accordance with one or more aspects, a system for vehicle accident avoidance is provided herein. The system may include, for instance: a processor and a memory configured to provide computer program instructions to the processor to execute the function of the following components: a monitoring component for monitoring a surrounding environment of the host vehicle; a moving object component for detecting other vehicles in a vicinity of the host vehicle by at least one visual sensor; a motion estimation component for estimating a speed and direction of each of the detected vehicles; a path projection component for calculating one or more projected paths of each of the detected vehicles based on their current estimated speed and direction, the current monitored surrounding environment, and other vehicle projected paths; a hazard probability component for estimating a probability of intersection of each projected path with the host vehicle; and an action component for providing an alert or action to the host vehicle if there is a high probability of intersection.

The system may further include an information conversion component for converting the estimated speed and direction of each of the detected vehicles into a canonical form; a known pattern comparison component for comparing the canonical form with known patterns of vehicles with known paths stored in a pattern store and identifying a match for the canonical form with a known pattern of vehicles with known paths; and wherein the path projection component generates one or more projected paths based on the known paths.

The system may further include a classification component for classifying a type of each detected vehicle; a behavior model store for retrieving an appropriate model for the type of each of the detected vehicles; and wherein the path projection component may generate one or more projected paths based on the appropriate models.

Still further, the system may include an identification component for identifying an identifier of a detected vehicle; a behavior model store for retrieving a model for the identified vehicle; and wherein the path projection component may generate one or more projected paths for the identified vehicle based on the model.

The system may be provided in an onboard system for a host vehicle with a storage access component for access to a remote storage of a behavioral model store and a previous vehicle pattern store and access to a local storage for caching a retrieved subset of the behavior model store and previous vehicle pattern store.

Figure 6:
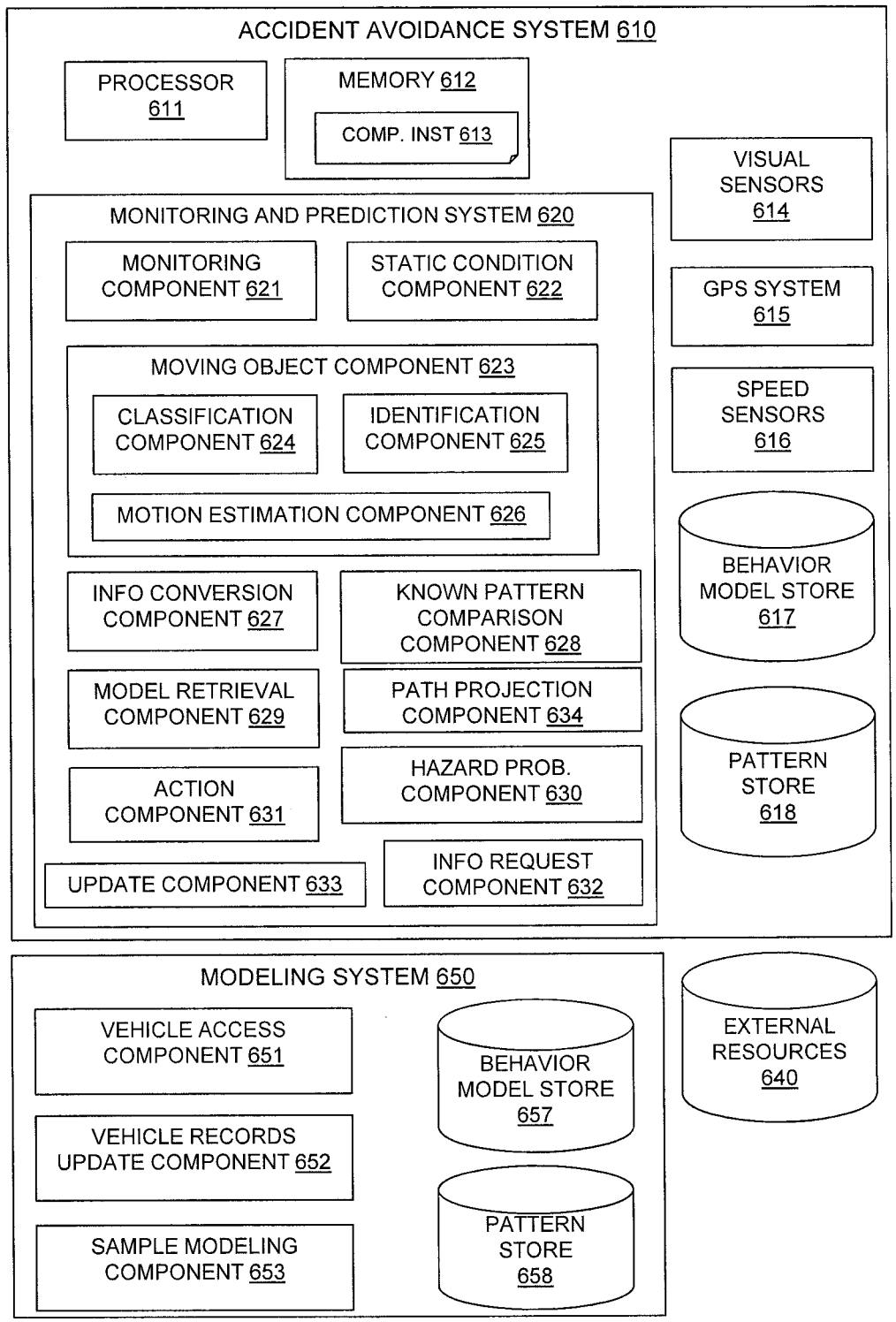
FIG. 6 is a block diagram of an example embodiment of a system, in accordance with one or more aspects of the present invention.

Referring to FIG. 6, a block diagram shows an example embodiment of the described system 600. An accident avoidance system 610 may be provided as an on vehicle system with a remote modeling system 650 which may be provided at a remote server either in continual or occasional contact with the on vehicle system. It there is constant communication with a remote server or cloud based system, some of the functionality described in the accident avoidance system 610 may be carried out remotely to the vehicle.

The accident avoidance system 610 may include at least one at least one processor 611, a hardware module, or a circuit for executing the functions of the described components which may be software units executing on the at least one processor. Memory 612 may be configured to provide computer instructions 613 to the at least one processor 611 to carry out the functionality of the components.

A monitoring and prediction system 620 may be provided in the accident avoidance system 610 including a monitoring component 621 which may receive input from one or more visual sensors 614 on the host vehicle which may be dedicated to the accident avoidance system 610. Input may also be received by the monitoring component 621 from other components of the vehicle such as a GPS system 615, speed and acceleration sensors 616, etc. and from external resources 640 such as mapping services, weather resources, etc. The monitoring component 621 may record the received inputs for further processing and may export these to the remote modeling system 650.

The monitoring and prediction system 620 may include a static condition component 622 for determining static conditions surrounding the host vehicle and a moving object component 623 for identifying moving objects in the surrounding area including other vehicles, pedestrians, and other moving hazards.

The moving object component 623 may include a classification component 624 to identifying a moving object as a class of object which may be used for behavior modeling. The moving object component 623 may also include an identification component 625 which may provide more precise modeling if the object can be actually identified, for example, by a vehicle license plate. The moving object component 623 may include a motion estimation component 626 for estimating the direction and speed of the motion of a moving object using inputs from the visual sensors 614, other host vehicle systems, and the static condition component 622.

An information conversion component 627 may receive inputs from the static condition component 622 and the moving object component 623 to convert the information to a canonical form that may be used in modeling and comparison.

A known pattern comparison component 628 may compare the converted information with known patterns. The known patterns may be stored in a pattern store 618 which may have a component on a remote server, which stores all patterns and may have a local component such as a smaller cache on the host vehicle. The cache on the host vehicle may store locally generated patterns and patterns retrieved from the remote server. Known patterns and resultant estimated motion paths may be retrieved from the pattern store 618 for use by the monitoring and prediction system 620. If the converted information is a new pattern, behavior models may be retrieved from a behavior model store 617 and estimated motion paths may be determined. A behavior model store 617 may also have a remote component and a local cache on the host vehicle for storing most recently used models. A path projection component 634 may determine one or more projected paths for detected vehicles.

A hazard probability component 630 may use the estimated motion paths to determine potential hazards and the probability of occurrence. A weighting component within the hazard probability component 630 may weight a hazard based on the severity of the hazard. An action component 631 may provide an alert or activate an action at the host vehicle dependent on the output of the hazard probability component 630.

The monitoring and prediction system 620 may include an update component 633 for updating the on vehicle behavior model store 617 and the pattern store 618 from its own results and from a remote modeling system 650, either constantly or periodically.

As an optional feature, if the accident avoidance system 610 is in constant communication with the remote modeling system 650, an information request component 632 may request information regarding current identified moving objects near the host vehicle from the remote modeling system 650 for use in the monitoring and prediction system 620.

The remote modeling system 650 may include a sample modeling component 653 for modeling behavior and generating models which are stored to a behavior model store 657 at the modeling system 650 which may be used to update the behavior model store 617 at the accident avoidance system 610 of the host vehicle. Similarly, known patterns of estimated paths or actions may be generated and stored at the pattern store 658 of the modeling system 650 which may be used to update the pattern store 618 at the accident avoidance system 610 of the host vehicle. The modeling system 650 may use machine learning techniques.

In addition, the remote modeling system 650 may include a vehicle access component 651 for providing access to records held by the remote modeling system 650 by accident avoidance systems 610 of host vehicles and a vehicle records update component 652 for updating the remote modeling system 650 with records from the accident avoidance systems 610 of host vehicles.

Figure 7A:
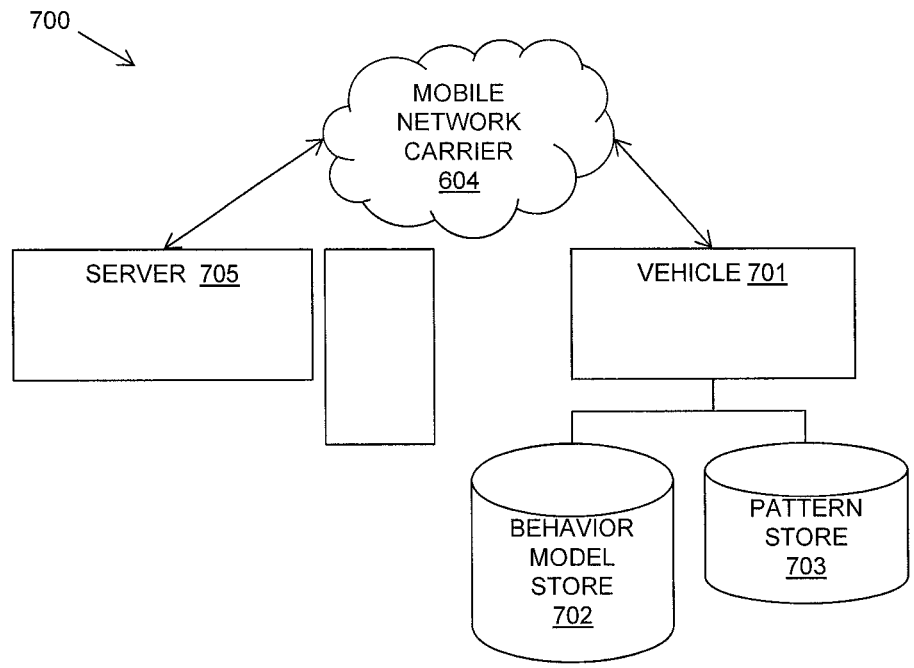
FIGS. 7A and 7B show example embodiments of system infrastructures, in accordance with one or more aspects of the present invention.

FIG. 7A shows a schematic diagram of an embodiment of an infrastructure that coordinates behavioral models. This topology is based on online updating. Information from different vehicles 701 may be sent over mobile network carriers 704. Information may include behavior model store 702 and also pattern store 703, if useful. All these pieces of information may be integrated on one or more centralized servers 705. On the other hand, moving vehicles 701 may request information about surrounding objects from the server 705. It may be inefficient to store all behavioral models that correspond to unique cases onboard of the vehicle and a local store in the form of a cache of the most recently used information and locally generated information may be kept. Once the system is able to identify a unique identify of a moving object, it may send that identity to the server 705 requesting a corresponding model. If the server 705 finds a corresponding model, it may be sent back to the vehicle 701 to be stored in its behavior model store 702.

Figure 7B:
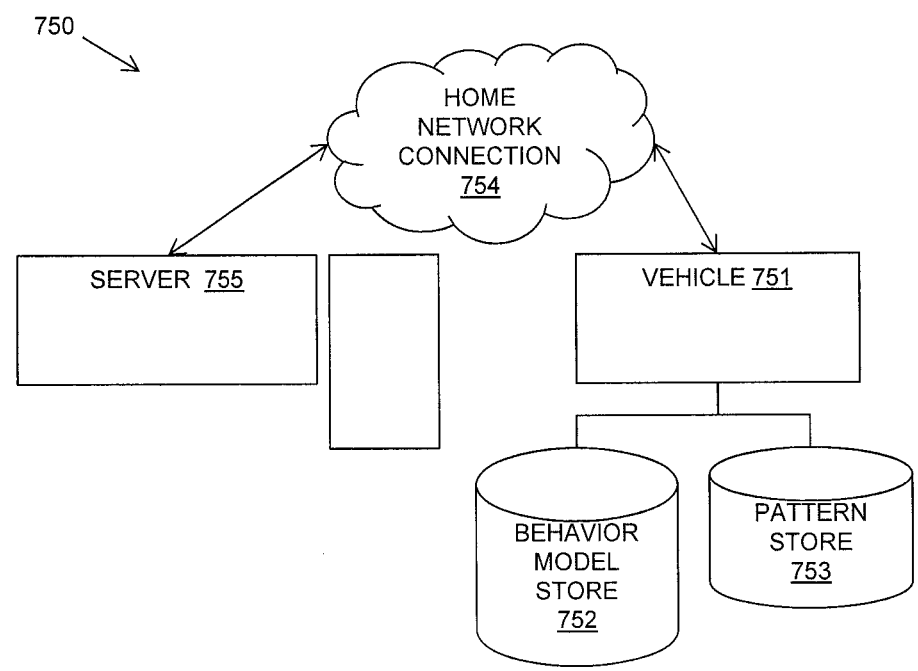

FIG. 7B shows a schematic diagram of an alternative embodiment 750 of an infrastructure that uses less or no network overhead. The vehicle 751 may connect to the server 755 through a provided cheaper local network connection in an office or home 754. The vehicles' behavior model store 752 and pattern store 753 may be uploaded to the server 755 and new updated data may be downloaded from the server 755.

Figure 8A:
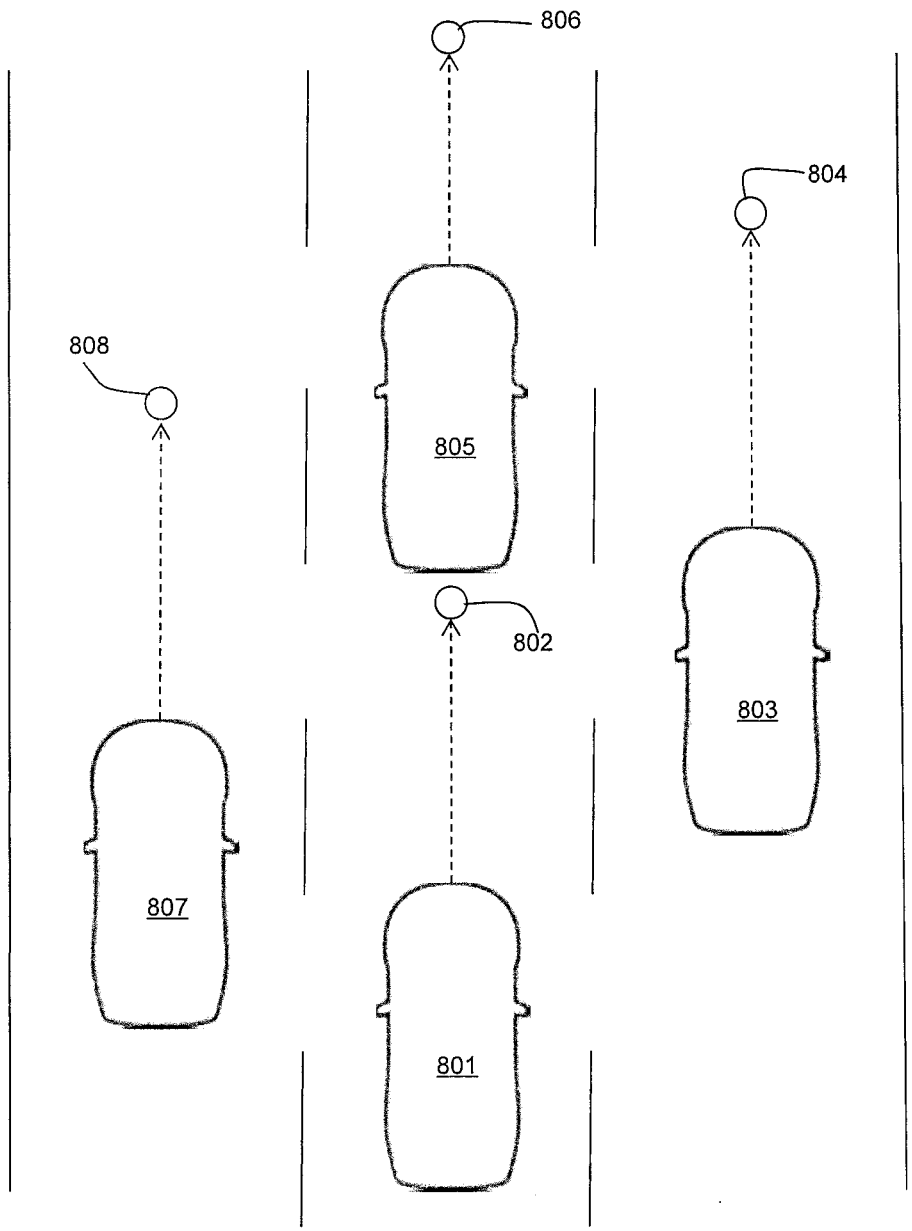
FIG. 8A to 8C are schematic diagrams of example embodiments of vehicle path projections, in accordance with one or more aspects of the present invention.
Figure 8B:
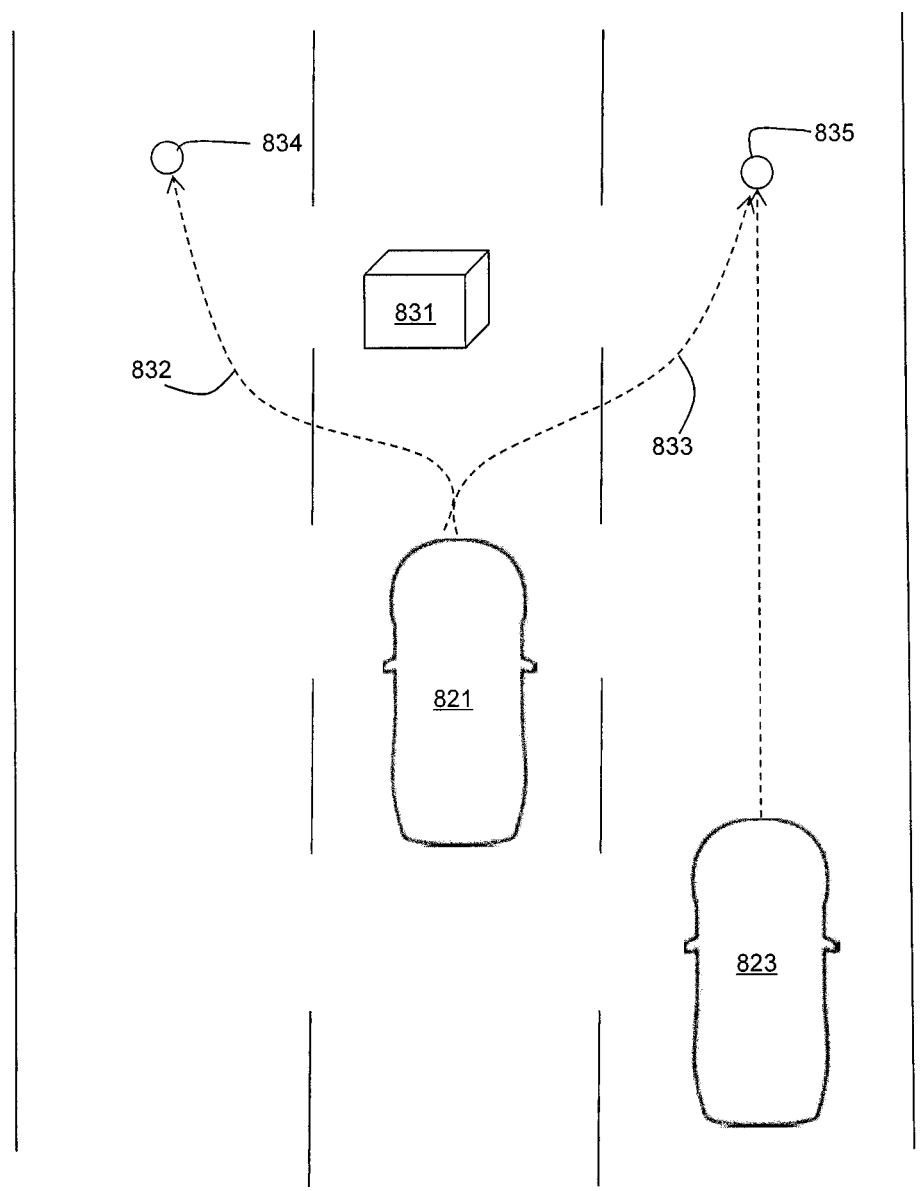
Figure 8C:
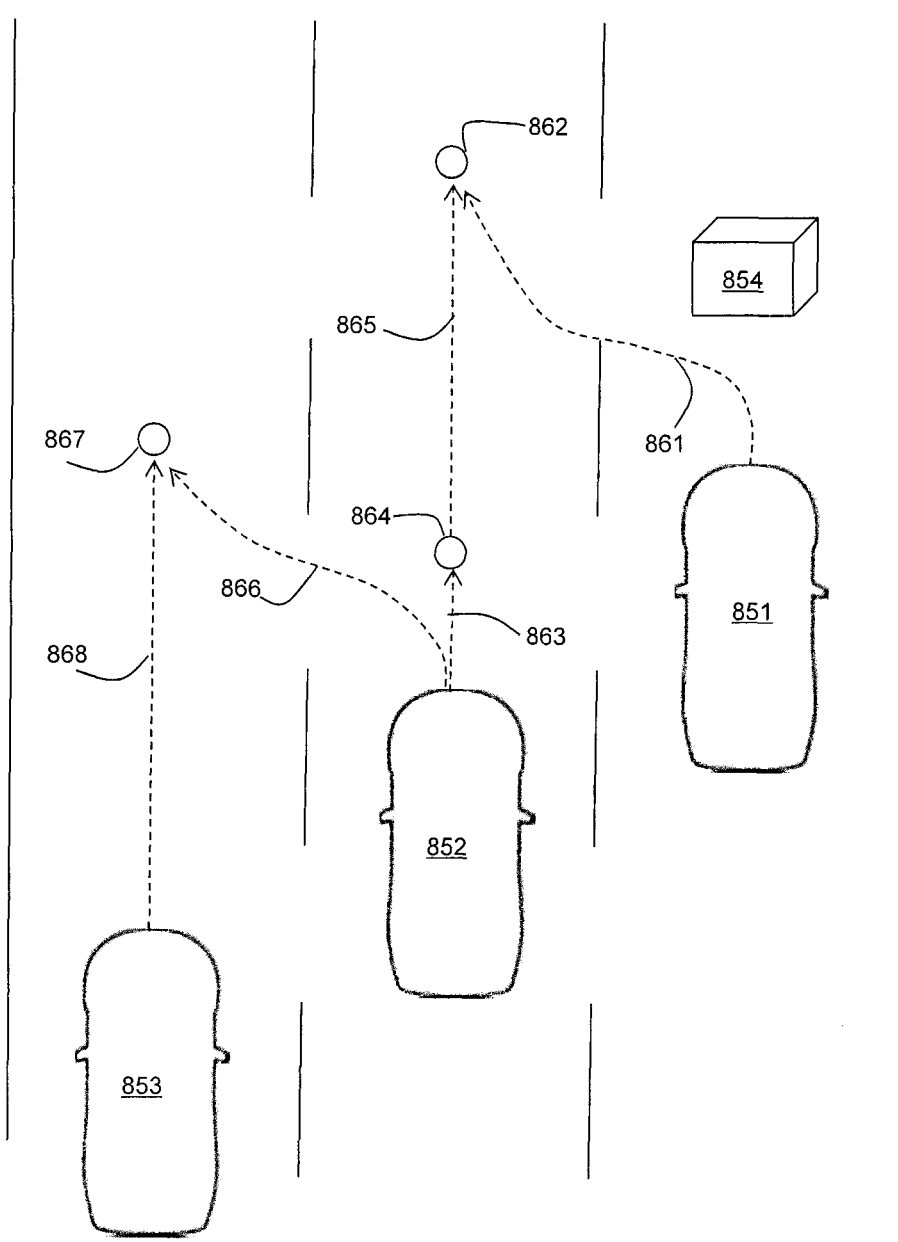

FIGS. 8A to 8C show an example of motion estimation and projection. It describes a usual commuting case. In FIG. 8A, vehicles 801, 803, 805 and 807 are identified by the system onboard another vehicle. No surrounding parameters are identified affecting the vehicle motion paths and thus their motion paths are projected through the arrows connecting these vehicles and the corresponding points 802, 804, 806 and 808. These points are the estimated locations of these vehicles in some point of time in the future.

FIG. 8B shows an example of a possible collision case. A system onboard a host vehicle (not shown) identifies two vehicles 821 and 823 in front of the host vehicle and, in addition, a stationary object 831, which is an obstacle in the path of vehicle 821. The system retrieves the models corresponding to each vehicle 821, 823. Then it projects the possible actions that are taken by each vehicle 821, 823. For vehicle 821, there are two possible paths, which are 832 and 833 to reach points 834 and 835 respectively after time t in the future. For vehicle 823 there is only one possible path, which is 836 to reach point 835, which is a point of intersection of paths and thus a possible collision point.

Probabilities for paths 832 and 833 are evaluated. These are calculated through the output of behavior model assigned to vehicle 821. The model considers the location of vehicle 821 relative to the road, location of the obstacle 831 and whether it is slightly oriented towards the left or right relative to vehicle 821. Also the model considers the location of other vehicles, which is in this case vehicle 823. If object 831 is slightly oriented towards the left, and the vehicle 823 is in the vehicle's 821 blind zone, then there is a high probability that path 833 will be used intersecting with path 836 and thus there is a high probability that a collision will occur at point 835. The system loaded onboard a vehicle behind the two vehicles 821, 823 identifies this case and either alerts the driver that a collision will take place in the right most lane thus blocking it and an obstacle is present in the middle lane so this is blocked too, and thus the driver should switch to the left most lane, or takes the action and moves the vehicle towards the left most lane.

FIG. 8C shows another example of a probable collision case, which requires deeper analysis. This incident is caused by a sequence of actions rather than a single action.

The proposed system identifies three vehicles 851, 852, and 853, in addition to an object 854 with their locations as shown in FIG. 8C. Object 854 is an obstacle to vehicle 851. The projected action is that vehicle 851 will change lanes through the pass 861 reaching the point 862 after time t. As a result behavioral model corresponding to vehicle 852 projects three paths: (a) path 863 where the vehicle breaks to reach point 864 in the same time t, (b) the vehicle moves with the same speed in the same direction through path 865 reaching the point 862 after time t, and (c) shifts to left lane through path 866 reaching point 867. Finally vehicle 853 is projected to move through path 868 to reach point 867 after time t. The probability corresponding to each path taken by the vehicle 852 is evaluated similar to the case in FIG. 8B. The system deduces that path 863 will lead to no trouble, while path 866 intersects by path 868 prompting a high collision probability. Depending on both probability and severity of actions are taken. For example, if the safe breaking path 863 has the highest probability, but still the danger path 866 has a considerable probability and high severity, contingency actions may take place or at least be proposed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
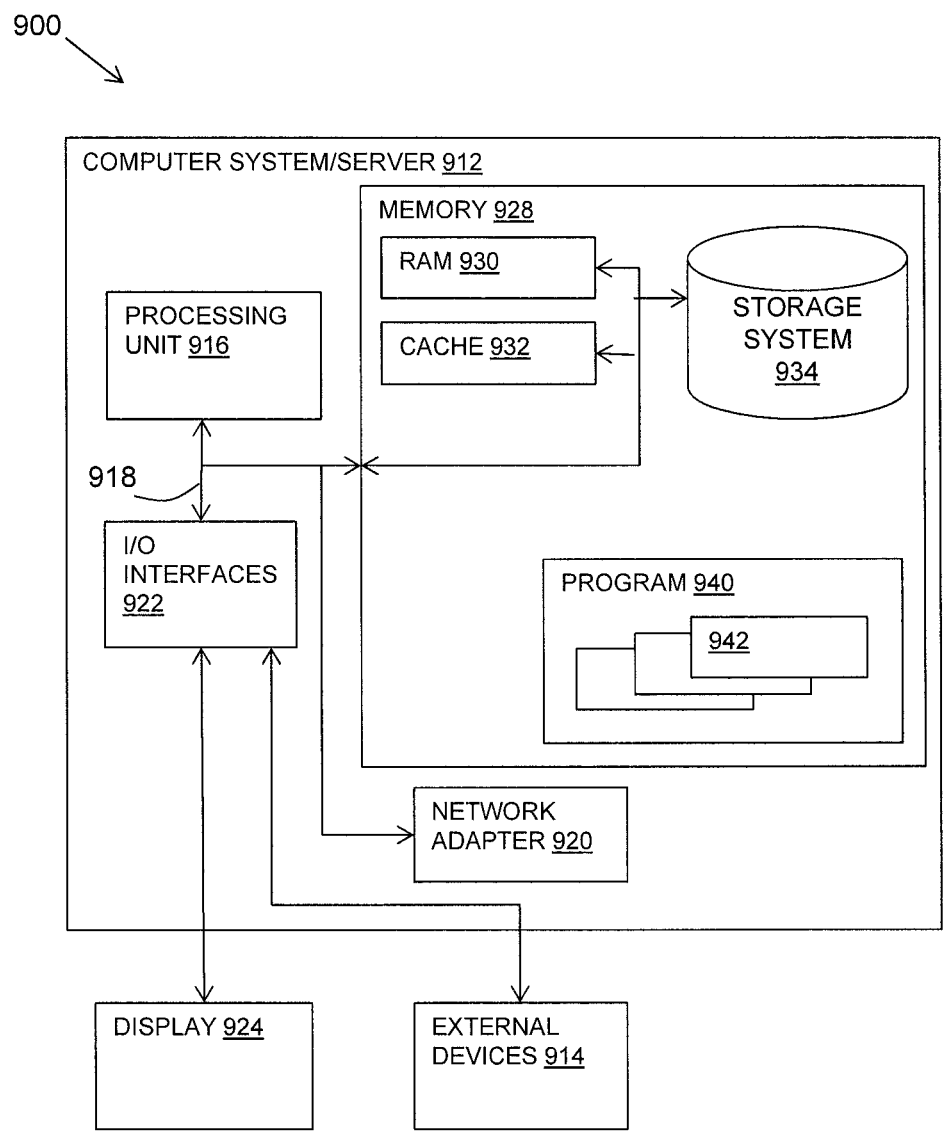
FIG. 9 is a block diagram of an embodiment of a computer system or cloud server in which aspects of the present invention may be implemented.

Referring now to FIG. 9, a schematic of an example of a system 900 in the form of a computer system or server is shown.

A computer system or server 912 may be operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

In FIG. 9, a computer system/server 912 is shown in the form of a general-purpose computing device. The components of the computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
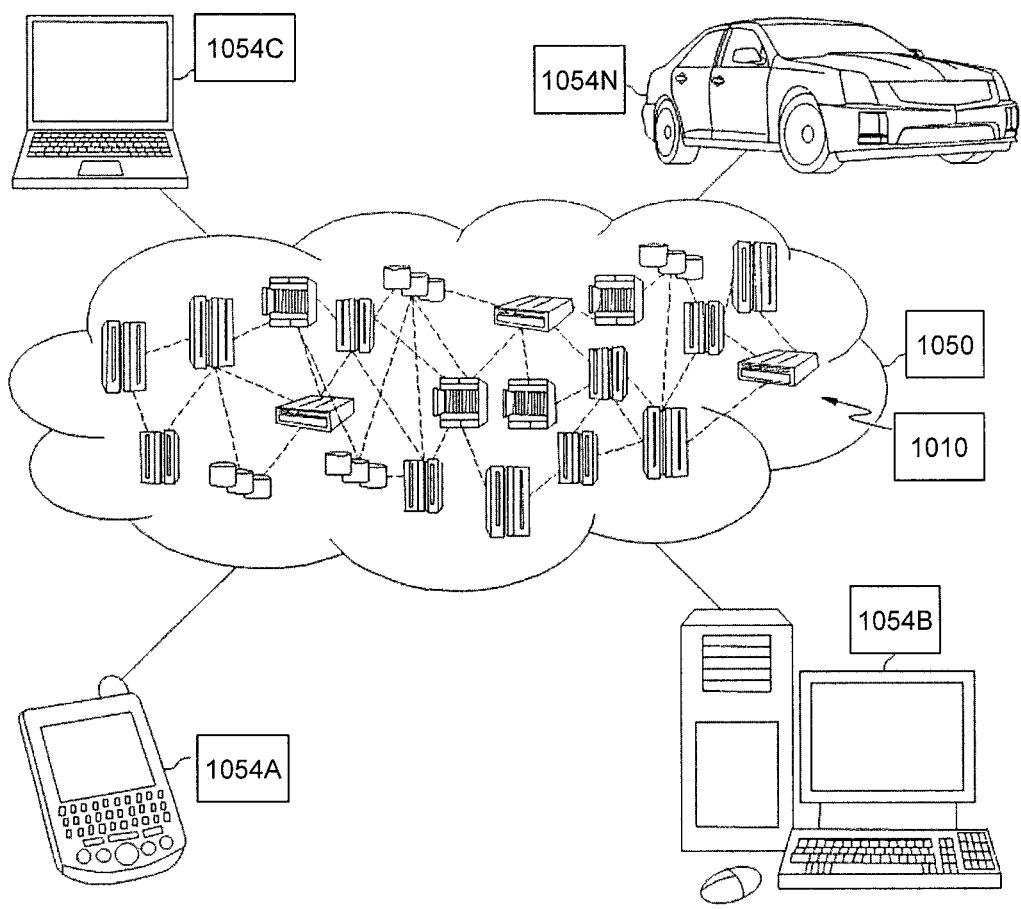
FIG. 10 is a schematic diagram of a cloud computing environment in which aspects of the present invention may be implemented.

Referring now to FIG. 10, illustrative cloud computing environment 1050 is depicted. As shown, cloud computing environment 1050 comprises one or more cloud computing nodes 1000 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 600 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 600 and cloud computing environment 1050 can communicate with any type of computerized device over any type of network and/or network addressable connection (e.g., using a web browser).

Figure 11:
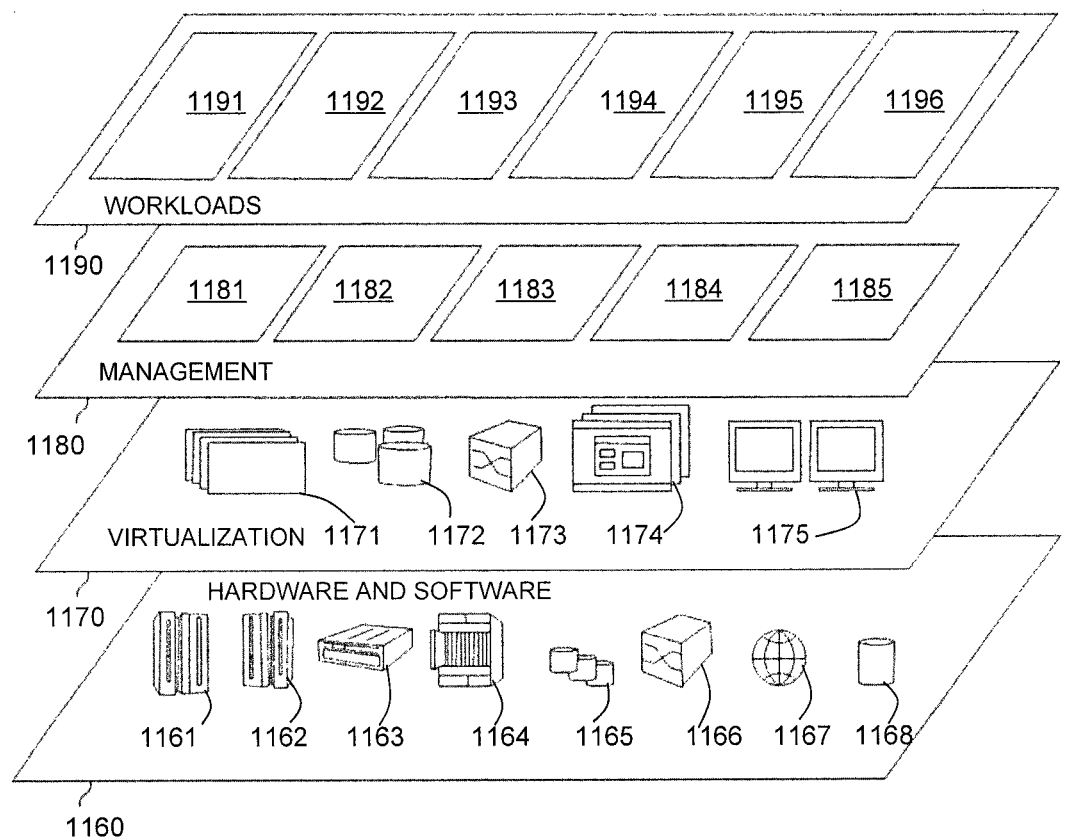
FIG. 11 is a diagram of abstraction model layers of a cloud computing environment in which aspects of the present invention may be implemented.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized.

Examples of workloads and functions which may be provided from this layer include: mapping and navigation 1191; software development and lifecycle management 1192; virtual classroom education delivery 1193; data analytics processing 1194; and transaction processing 1195; and vehicle monitoring 1196 as provided by the described system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for vehicle accident avoidance carried out with respect to a host vehicle, comprising:
    monitoring a surrounding environment of the host vehicle;
    detecting other vehicles in the surrounding environment of the host vehicle by at least one visual sensor;
    estimating a speed and direction of each of the detected vehicles;
    calculating one or more projected paths of each of the detected vehicles based on their current estimated speed and direction, the monitored surrounding environment, and other detected vehicle projected paths, wherein the calculating further comprises:
        uniquely identifying a detected vehicle;
        retrieving a historical-data-based model for the uniquely identified, detected vehicle, the historical-data-based model comprising historical vehicle travel route data and historical vehicle-moving behavioral data along those routes for the uniquely identified, detected vehicle; and
        generating one or more projected paths for the uniquely identified, detected vehicle based, at least in part, on the historical-data-based model for the uniquely identified, detected vehicle, including the historical vehicle travel route data and the historical vehicle-moving behavioral data along those routes;
    estimating a probability of intersection of each projected path with the host vehicle; and
    providing an alert or action to the host vehicle if there is a high probability of intersection.

2. The method as claimed in claim 1, further including:
    converting the estimated speed and direction of each of the detected vehicles into a canonical form;
    comparing the canonical form with known patterns of vehicles with known paths;
    identifying a match for the canonical form with a known pattern of vehicles with known paths; and
    generating one or more projected paths based on the known paths.

3. The method as claimed in claim 1, further including:
    classifying a type of each detected vehicle;
    retrieving an appropriate model for the type of each of the detected vehicles; and
    generating one or more projected paths based on the appropriate models.

4. The method as claimed in claim 1, wherein monitoring a surrounding environment of the host vehicle includes one or more of the group of: monitoring the road using the one or more visual sensors for hazards; monitoring route parameters based on map resources; monitoring weather and/or visibility conditions.

5. The method as claimed in claim 1, wherein estimating a speed and direction of each of the detected vehicles includes:
    obtaining a current speed of the host vehicle;
    at regular time intervals, calculating and storing the distance between the host vehicle and the detected vehicles;
    referencing stored distances; and
    estimating motion of each detected vehicle in horizontal and vertical directions.

6. The method as claimed in claim 1, including:
    providing an alert or action to the host vehicle if there is an extreme hazard is detected.

7. The method of claim 1, wherein the uniquely identifying comprises uniquely identifying one or more physical characteristics of the detected vehicle.

8. The method of claim 1, wherein the uniquely identifying comprises reading a license plate of the detected vehicle.

9. A system for vehicle accident avoidance, comprising:
    a memory; and
    a processor communicatively coupled to the memory, wherein the system performs a method comprising:
        monitoring a surrounding environment of a host vehicle;
        detecting other vehicles in the surrounding environment of the host vehicle by at least one visual sensor;
        estimating a speed and direction of each of the detected vehicles;
    calculating one or more projected paths of each of the detected vehicles based on their current estimated speed and direction, the monitored surrounding environment, and other detected vehicle projected paths, wherein the calculating further comprises:
        uniquely identifying a detected vehicle;
        retrieving a historical-data-based model for the uniquely identified, detected vehicle, the historical-data-based model comprising historical vehicle travel route data and historical vehicle-moving behavioral data along those routes for the uniquely identified, detected vehicle; and
        generating one or more projected paths for the uniquely identified, detected vehicle based, at least in part, on the historical-data-based model for the uniquely identified, detected vehicle, including the historical vehicle travel route data and the historical vehicle-moving behavioral data along those routes;

estimating a probability of intersection of each projected path with the host vehicle; and providing an alert or action to the host vehicle if there is a high probability of intersection.

10. The system as claimed in claim 9, further including:
converting the estimated speed and direction of each of the detected vehicles into a canonical form;
comparing the canonical form with known patterns of vehicles with known paths;
identifying a match for the canonical form with a known pattern of vehicles with known paths; and
generating one or more projected paths based on the known paths.

11. The system as claimed in claim 9, further including:
classifying a type of each detected vehicle;
retrieving an appropriate model for the type of each of the detected vehicles; and
generating one or more projected paths based on the appropriate models.

12. The system as claimed in claim 9, wherein estimating the speed and direction of each of the detected vehicles comprises:
obtaining a current speed of the host vehicle;
at regular time intervals, calculating and storing the distance between the host vehicle and the detected vehicles;
referencing stored distances; and
estimating motion of each detected vehicle in horizontal and vertical directions.

13. The system as claimed in claim 9, wherein the system is provided as an onboard system for the host vehicle, and further: accesses a remote storage for the historical-data-based model, and caches a retrieved subset of the historical-data-based model.

14. The system as claimed in claim 13, further including checking for required data before accessing the remote storage for retrieval of the required data.

15. The system as claimed in claim 13, wherein the accessing uses a mobile communication network.

16. The system as claimed in claim 13, further including providing access to local storage of the historical-data-based-model at the onboard system and updating the local storage periodically from the remote storage via a local area network communication.

17. The system as claimed in claim 9, wherein the system includes a remote modeling system in which monitored vehicle information is used to model vehicle behavior for types and individual identifications of vehicles.

18. The system as claimed in claim 9, wherein the system is provided remotely to the host vehicle.

19. The system as claimed in claim 9, providing an alert or action to the host vehicle if there is an extreme hazard is detected.

20. A computer program product for vehicle accident avoidance, the computer program product comprising a computer readable storage medium having program instructions embodied therewith, the program instructions executable by a processor to cause the processor to:
monitor a surrounding environment of a host vehicle;
detect other vehicles in the surrounding environment of the host vehicle by at least one visual sensor;
estimate a speed and direction of each of the detected vehicles;
calculate one or more projected paths of each of the detected vehicles based on their current estimated speed and direction, the monitored surrounding environment, and other detected vehicle projected paths, wherein the calculating further comprises:
uniquely identifying a detected vehicle;
retrieving a historical-data-based model for the uniquely identified, detected vehicle, the historical-data-based model comprising historical vehicle travel route data and historical vehicle-moving behavioral data along those routes for the uniquely identified, detected vehicle; and
generating one or more projected paths for the uniquely identified, detected vehicle based, at least in part, on the historical-data-based model for the uniquely identified, detected vehicle, including the historical vehicle travel route data and the historical vehicle-moving behavioral data along those routes;
estimate a probability of intersection of each projected path with the host vehicle; and
provide an alert or action to the host vehicle if there is a high probability of intersection.

* * * * *